US012736617B2

(12) United States Patent
Veyrac et al.

(10) Patent No.: US 12,736,617 B2
(45) Date of Patent: Sep. 15, 2026

(54) COMPOSITE FREQUENCY-MODULATED MILLIMETRE-WAVE RADAR DEVICE

(71) Applicant: THALES, Courbevoie (FR)

(72) Inventors: Yoan Veyrac, Merignac Cedex (FR); Pascal Cornic, Brest (FR); Renan Le Gall, Velizy-Villacoublay (FR); Gonzague Bertin De La Hautiere, Merignac Cedex (FR)

(73) Assignee: THALES, Courbevoie (FR)

( * ) Notice: Subject to any disclaimer, the term of this patent is extended or adjusted under 35 U.S.C. 154(b) by 293 days.

(21) Appl. No.: 18/357,075

(22) Filed: Jul. 21, 2023

(65) Prior Publication Data

US 2024/0027578 A1 Jan. 25, 2024

(30) Foreign Application Priority Data

Jul. 21, 2022 (FR) ...................................... 2207498

(51) Int. Cl.
*G01S 7/35* (2006.01)
*G01S 7/03* (2006.01)
*G01S 13/89* (2006.01)

(52) U.S. Cl.
CPC ................ *G01S 7/352* (2013.01); *G01S 7/03* (2013.01); *G01S 13/89* (2013.01)

(58) Field of Classification Search
CPC ............. G01S 7/352; G01S 7/03; G01S 13/89
See application file for complete search history.

(56) References Cited

U.S. PATENT DOCUMENTS

2018/0196124 A1* 7/2018 Vacanti ..................... G01S 7/41
2019/0235051 A1* 8/2019 Melzer .................... G01S 7/032
(Continued)

OTHER PUBLICATIONS

Foreign Communication from a Related Counterpart Application, France Search Report dated Feb. 14, 2023, France Application No. 2207498 filed on Jul. 21, 2022.

*Primary Examiner* — Nazra Nur Waheed
(74) *Attorney, Agent, or Firm* — Conley Rose, P.C.

(57) ABSTRACT

The invention relates to a radar system comprising:

a frequency synthesizer, configured to generate a modulated local signal ($S_{f0+\Delta f0}$);

at least one frequency multiplier, configured to supply an intermediate-frequency local signal ($S_{f\_inter+\Delta f\_inter}$) to each emission channel (8) and to each reception channel, the intermediate-frequency local signal ($S_{f\_inter+\Delta f\_inter}$) being a fractional multiple of the modulated local signal ($S_{f0+\Delta f0}$);

a plurality of emission frequency transposition components, the emission frequency transposition components being synchronized with one another by the modulated local wave ($S_{f0+\Delta f0}$);

a plurality of reception frequency transposition components, the reception frequency transposition components being synchronized with one another by the modulated local signal ($S_{f0+\Delta f0}$), the reception channels being configured to demodulate the intermediate-frequency reception signal ($S_{f\_inter\_Rx+\Delta f\_inter\_Rx}$) using the intermediate-frequency local signal ($S_{f\_inter+\Delta f\_inter}$).

9 Claims, 4 Drawing Sheets

(56) References Cited

U.S. PATENT DOCUMENTS

2020/0184161 A1* 6/2020 Pettus .................... H01Q 21/24
2022/0239301 A1* 7/2022 Chenakin ................ H03L 7/087

* cited by examiner

Mixing products in a conventional architecture

Mixing products in the autotransposition architecture according to the invention

COMPOSITE FREQUENCY-MODULATED MILLIMETRE-WAVE RADAR DEVICE

CROSS-REFERENCE TO RELATED APPLICATIONS

The present application claims priority to French Application No. 2207498 filed with the Intellectual Property Office of France on Jul. 21, 2022, which is incorporated herein by reference in its entirety for all purposes.

TECHNICAL FIELD

The invention relates to a multiple input multiple output (MIMO) radar processing system and method. The invention is particularly suitable for millimetre-band radars for imaging applications.

For landing assistance applications, airborne radars have to be able to produce a precise image at long range in the axis of movement of the carrier, even with reduced visibility.

Active-antenna radars intended to carry out imaging in the direction of movement of the carrier preferably use high frequencies, in the millimetre range (30 GHz-300 GHz). For these applications, the radars have to operate with a large bandwidth (this having a direct influence on distance resolution), on a very high carrier frequency and with a large antenna to achieve the desired angular resolution.

Their architecture is generally based on emitters/receivers integrated into electronic chips, denoted using the term radar chipset, possibly comprising multiple emission and reception channels. The radars may use integrated circuits from automotive radar applications, this making it possible to obtain a low-cost solution.

In automotive applications, the total size of the antenna is limited, and therefore the length of the links between the emission/reception channel and the radiating element remains small, with acceptable losses. For some applications operating with small antennas at a frequency that is not that high, the intermediate frequency on which the waveform generator integrated into the chip operates may directly be the radiating frequency of the antennas.

However, in airborne applications, the targeted radiating frequency is very high (W band, between 75 and 110 GHz). In this case, the intermediate frequency cannot be directly the radiating frequency of the antennas.

In the context of an airborne application, the required angular resolution is fine and therefore the total size of the antenna is relatively large. As a result, the typical distance between the outputs of the chips and the antennas is of an order of magnitude of around ten centimetres, this possibly leading to losses and very significant dispersions when the radiating frequency is high.

These losses would imply a reduction in the range of the radar, the emission power would be limited, and the reception sensitivity would be reduced, this not being acceptable in the targeted airborne application.

In this context, it is known to use a dedicated component, for example a monolithic microwave integrated circuit (or MMIC), located as close as possible to the antennas, for amplifying the emitted and received signals in order to improve the sensitivity performance of the radar.

However, in this architecture, it is essential to have good alignment between the emission and reception channels respectively, as there is a great length between the chip and the antenna. It remains difficult to channel the signals on wide frequency bands, for reasons of technological dispersion between the components.

Indeed, at more than 80 GHz, there are large phase and amplitude dispersions. These dispersions may be controlled at a fixed frequency, through fine calibration between the components, but the calibration cannot be carried out on a plurality of frequencies, over a wide band.

These dispersion constraints may become problematic with regard to technological tolerances in terms of implementing the printed circuits, this possibly leading to a limit in performance (notably by limiting the bandwidths used), or else to a higher cost of the technology.

There is therefore a need to produce a large multichannel antenna, with a high on-carrier wideband frequency modulation, while as far as possible overcoming effects interfering with the signal such as phase offsets, delays, attenuations, or even frequency dispersions.

SUMMARY OF THE INVENTION

One subject of the invention is therefore a multiple input multiple output (MIMO) radar system for imaging applications, configured to emit and receive signals respectively on a plurality of emission channels and reception channels, the system comprising:

- a frequency synthesizer, configured to generate a modulated local signal, obtained by modulating a local signal having a predefined frequency over a modulation bandwidth;
- at least one frequency multiplier, configured to supply an intermediate-frequency local signal to each emission channel and to each reception channel, the intermediate-frequency local signal being a fractional multiple of the modulated local signal, the multiplication being applied to the predefined frequency and to the modulation band;
- a plurality of emission frequency transposition components, the emission frequency transposition components being synchronized with one another by the modulated local wave, each emission frequency transposition component being connected between an emission channel and an emission radiating element, and configured to mix an intermediate-frequency emission signal from an associated emission channel and the modulated local signal so as to obtain a signal that is transmitted to the emission radiating element;
- a plurality of reception frequency transposition components, the reception frequency transposition components being synchronized with one another by the modulated local signal, each reception frequency transposition component being connected between a reception channel and a reception radiating element, and configured to mix a signal received by an associated reception radiating element with the modulated local signal so as to obtain an intermediate-frequency reception signal; the reception channels being configured to demodulate the intermediate-frequency reception signal using the intermediate-frequency local signal.

Advantageously, the fractional multiple is equal to k/m where m=1, and k is between 2 and 6.

Advantageously, k=4, and the intermediate-frequency local signal has a carrier frequency between 76 and 81 GHz.

Advantageously, the modulation of the local signal is a frequency modulation.

Advantageously, the frequency modulation varies according to a frequency ramp-type linear law.

Advantageously, the emission frequency transposition components and the reception frequency transposition components are monolithic microwave integrated circuits.

Advantageously, the emission channels and the reception channels are distributed in at least two integrated circuits, each integrated circuit comprising its own frequency multiplier, the frequency synthesizer being located in one of the integrated circuits, called master integrated circuit, the at least one other integrated circuit being called slave integrated circuit, the master integrated circuit and the slave integrated circuit being networked such that the frequency multiplier of each slave integrated circuit receives the modulated local signal.

The invention also relates to an aircraft comprising the abovementioned system.

The invention also relates to a radar processing method for imaging applications, using a radar comprising a plurality of emission channels and reception channels, the method comprising:

- generating a modulated local signal, obtained by modulating a local wave having a predefined frequency over a modulation bandwidth;
- supplying an intermediate-frequency local signal to each emission channel and to each reception channel, the intermediate-frequency local signal being a fractional multiple of the modulated local signal, the multiplication being applied to the predefined frequency and to the modulation band;
- synchronizing a plurality of emission frequency transposition components with one another, the emission frequency transposition components being synchronized with one another by the modulated local signal, each emission frequency transposition component being connected between an emission channel and an emission radiating element, and mixing an intermediate-frequency emission signal from an associated emission channel and the modulated local signal so as to obtain a signal that is transmitted to the emission radiating element;
- synchronizing a plurality of reception frequency transposition components with one another, the reception frequency transposition components being synchronized with one another by the modulated local signal, each reception frequency transposition component being connected between a reception channel and a reception radiating element, and mixing a signal received by an associated reception radiating element with the modulated local signal so as to obtain an intermediate-frequency reception signal;
- demodulating the intermediate-frequency reception signal using the intermediate-frequency local signal.

DESCRIPTION OF THE FIGURES

Other features, details and advantages of the invention will become apparent on reading the description given with reference to the appended drawings, which are given by way of example.

Figure 1:
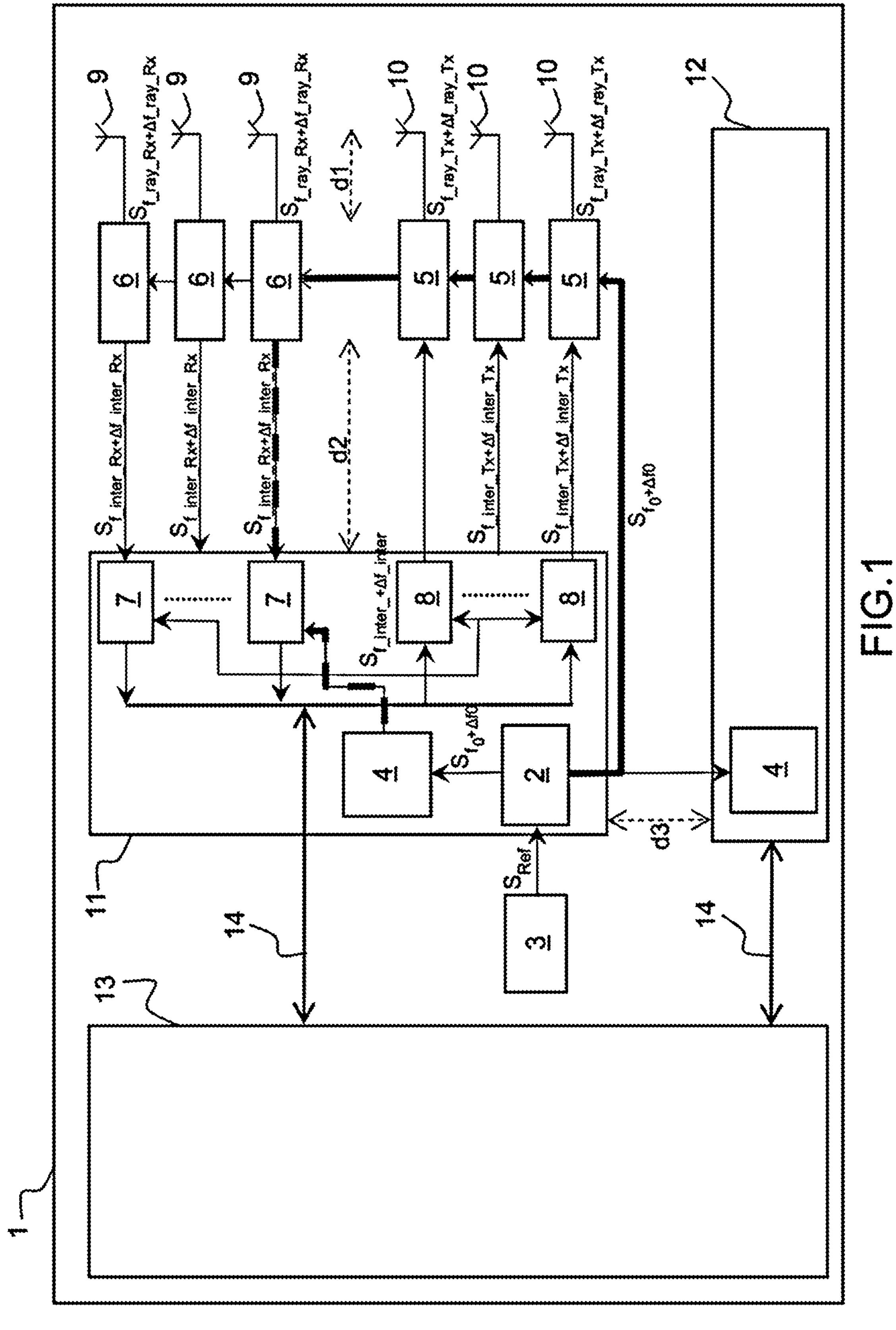
FIG. 1 illustrates a radar imaging system according to the invention.

An oscillator 3 generates a reference signal $S_{ref}$ having an oscillation frequency, generally of a few tens of MHz. The oscillator 3 may be a crystal oscillator, also called quartz oscillator, or any other electronic component that has the useful property of oscillating at a stable frequency.

The frequency synthesizer 2 generates a modulated local signal $S_{f0+\Delta f0}$ having a predefined frequency $f_0$ (generally of a few GHz or a few tens of GHz) over a modulation bandwidth $\Delta_{f0}$, from the reference signal $S_{ref}$.

The frequency of the modulated local signal $S_{f0+\Delta f0}$ is then multiplied by a factor k/m (k and m are integers), by a frequency multiplier 4. The frequency multiplier 4 supplies an intermediate-frequency local signal $S_{f\_inter+\Delta f\_inter}$ that is a frequency fractional multiple of the modulated local signal $S_{f0+\Delta f0}$:

$$f\_\text{inter}+\Delta f\_\text{inter}=k/m(f_0+\Delta f_0)$$

The frequency multiplier 4 creates an (integer or non-integer) harmonic of the frequency of the input signal. Given that the input signal has a predefined frequency $f_0$ and is modulated over a bandwidth $\Delta f_0$, the frequency multiplication is applied to the predefined frequency $f_0$ and to the bandwidth $\Delta f_0$.

The invention is not limited to an integer k/m ratio. A fractional multiple may be synthesized using frequency synthesis slaved by a phase-locked loop (PLL). The division ratio of the phase-locked loop determines the multiplication ratio of the frequency at the output of the frequency multiplier 4.

The frequency synthesizer 2 and the frequency multiplier 4 are integrated into the radar chip 11. The oscillator 3 may be located outside the radar chip 11 for performance and bulk reasons. As an alternative, the oscillator 3 could be integrated into the radar chip 11.

The intermediate-frequency local signal $S_{f\_inter+\Delta f\_inter}$ is transmitted to each emission channel 8, which applies thereto a phase code so as to be able to identify each emission channel during the radar processing. Each emission channel 8 therefore generates an intermediate-frequency emission signal $S_{f\_inter\_Tx+\Delta f\_inter\_Tx}$.

The radar imaging system comprises a plurality of emission frequency transposition components 5 that make it possible to amplify the emitted signals in order to improve the performance of the radar. They thus make it possible to transpose the intermediate-frequency emission signal $S_{f\_inter\_Tx+\Delta f\_inter\_Tx}$ into a frequency band suitable for the emission radiating element 10. Each emission frequency transposition component 5 is connected between an emission channel 8 and an emission radiating element 9.

The emission frequency transposition component 5 also comprises a mixer function, for mixing the intermediate-frequency emission signal $S_{f\_inter\_Tx+\Delta f\_inter\_Tx}$ and the modulated local signal $S_{f0+\Delta f0}$. Each emission frequency transposition component 5 is thus connected directly to the modulator 2.

The frequency radiated by the emission radiating element 9 is then obtained by upmixing (supradyne transposition) the intermediate-frequency emission signal $S_{f\_inter\_Tx+\Delta f\_inter\_Tx}$ and the modulated local signal $S_{f0+\Delta f0}$, and thus has the value:

$$f_{ray\_Tx}+\Delta f_{ray\_Tx}=f_{inter}+\Delta f_{inter}+f_0+\Delta f_0=k/m\cdot(f_0+\Delta f_0)+(f_0+\Delta f_0)=(k+m)/m\cdot(f_0+\Delta f_0)$$

To receive a signal $S_{f\_ray\_Rx+\Delta f\_ray\_Rx}$ received after the transmitted signal $S_{f\_ray\_Tx+\Delta f\_ray\_Tx}$ has been reflected or backscattered by the external environment, a plurality of reception frequency transposition components 6 are synchronized with one another by the modulated local signal $S_{f0+\Delta f0}$. Each reception frequency transposition component 6 is connected between a reception channel 7 and a reception radiating element 9. The reception frequency transposition component 6 mixes a signal $S_{f\_ray\_Rx+\Delta f\_ray\_Rx}$ received by an associated reception radiating element 9 with the modulated local signal $S_{f0+\Delta f0}$ so as to obtain an intermediate-frequency reception signal $S_{f\_inter\_Rx+\Delta f\_inter\_Rx}$ (infradyne transposition). The reception frequency transposition component 6 therefore has a mixer and amplifier function.

The reception channels 7 are connected directly to the frequency multiplier 4; they demodulate the intermediate-frequency reception signal $S_{f\_inter\_Rx+\Delta f\_inter\_Rx}$ using the intermediate-frequency local signal $S_{f\_inter+\Delta f\_inter}$ generated by the frequency multiplier 4.

Advantageously, the emission frequency transposition components 5 and the reception frequency transposition components 6 are monolithic microwave integrated circuits (MMIC). Since the antennas are not collocated, each frequency transposition component is integrated on its own MMIC. Integrating the frequency transposition components in the form of an MMIC makes them easier to integrate into the printed circuit of the radar imaging system, and reduces their bulk in comparison with other connection solutions such as coaxial cables.

The demodulated data from the reception channels 7, in baseband, are digitized and transmitted to the acquisition module 13, which is connected to the radar chip 11 via a data link 14, such as a digital bus 14. The acquisition module 13 may then carry out the processing needed to image the scene covered by the radar imaging system. The processing may consist in carrying out computational beamforming if the emission channels are in phase, or more generally MIMO processing known to those skilled in the art.

The invention thus makes it possible to reduce the intermediate frequency at emission and at reception. Rather than transposing the intermediate-frequency signals with a fixed frequency, as is the case in the prior art, the intermediate-frequency signals are transposed with a frequency band, and it is the multiplication of the product of the intermediate frequency band and the band of the local signal that produces the radiating band. One part of the modulation band is carried by the band of the intermediate-frequency signal, and the other part is carried by the band of the modulated local signal.

The radar imaging system according to the invention has the advantage of being able to utilize radar chips integrated into low-cost technologies stemming from the automotive sector and operating in the [76-81 GHz] frequency band, so as to design a large antenna that makes it possible to achieve a long range and fine angular resolution and that is compatible with airborne applications.

The synchronization routing, typically a few tens of centimetres in a MIMO imaging radar operating in the W band, is carried out at a frequency around the frequency $f_0$ of the modulated local signal: the routing between the chip 11 and the emission frequency transposition components (5, 6), typically of the order of magnitude of 10 cm (distance d2 in FIG. 1), is carried out at a frequency around the intermediate frequency $f_{inter}$. Only the routing between the emission frequency transposition components and the emission and reception radiating elements, which are spaced by a distance typically less than a centimetre (distance d1 in FIG. 1), is situated at the high radiating frequency $f_{ray}$.

The fractional multiple is advantageously an integer between 2 and 6, preferably equal to 4 (k between 2 and 6, and m=1). Beyond a ratio equal to 6, spectral purity is highly degraded.

According to one embodiment of the invention, the radar chips 11 may stem from automotive radar applications, with an intermediate frequency $f_{inter}$ in the [76-81 GHz] band. The frequency $f_0$ of the modulated local signal may be a 4th-order subharmonic 4 (k/m=4), situated in the [19-20.25 GHz] band. The radiated signal is then in the [95-101.25 GHz] frequency band.

This embodiment makes it possible to implement the invention based on technological building blocks that have been popularized by automotive applications. It furthermore has the advantage of positioning the image band of the mixing carried out by the reception frequency transposition components (5, 6) around 60 GHz, this corresponding precisely to the level of the first absorption line of oxygen (attenuation of the order of 10 dB/km).

Figure 2:
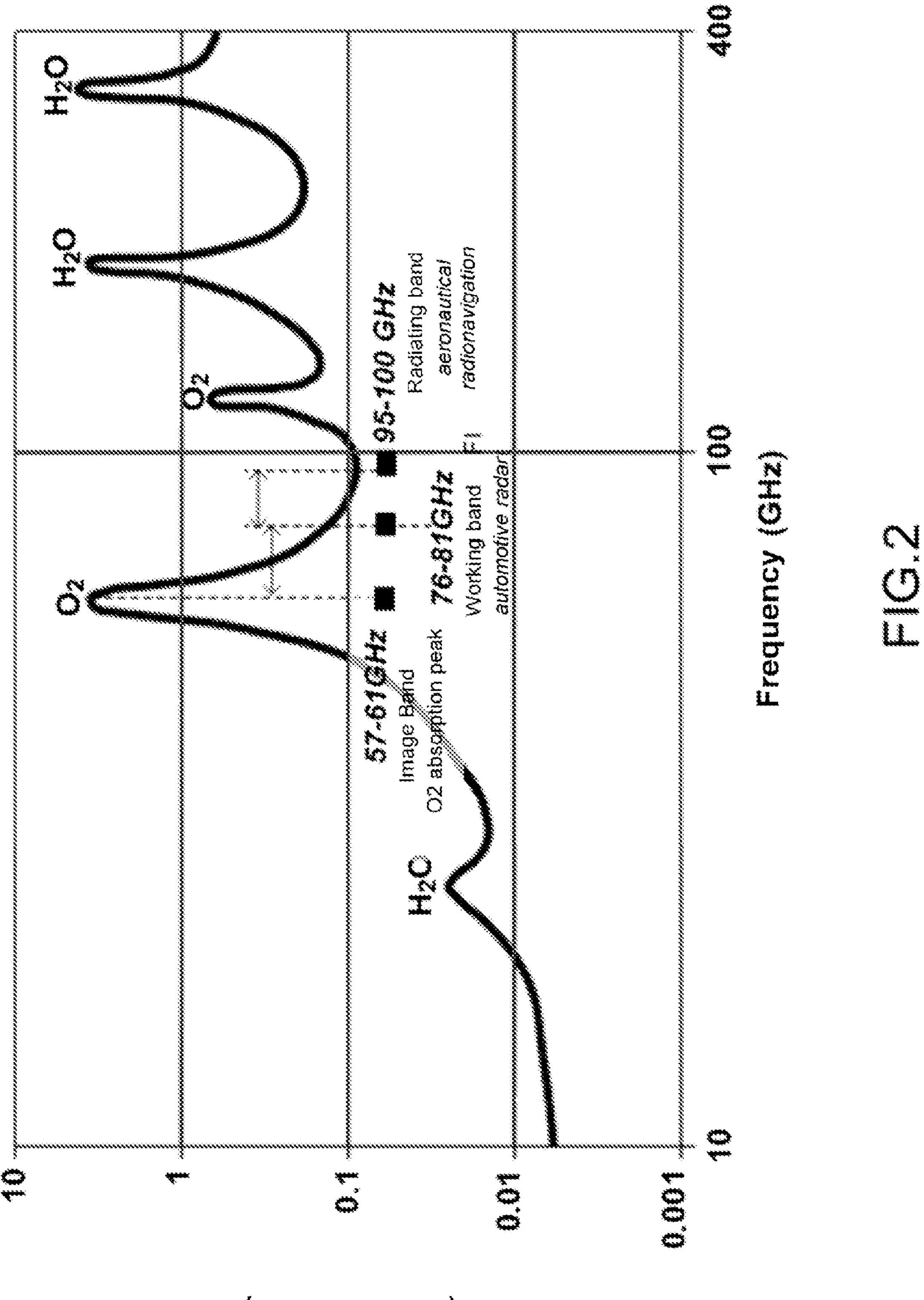
FIG. 2 illustrates the attenuation curve of oxygen as a function of frequency.

FIG. 2 illustrates the attenuation of oxygen as a function of frequency. An attenuation peak occurs around 60 GHz. The impact of parasitic radiation is significantly reduced in the image band due to the high attenuation of the radiation by oxygen molecules. It is therefore not necessary to put in place a complex rejection architecture for the image band in the frequency transposition components.

According to another embodiment, based on 24 GHz automotive radar technologies, the frequency $f_0$ may be within the 24 GHz band, and the frequency $f_{inter}$ may be within the 72 GHz band (with a ratio k/m=3), making it possible to obtain a radiated frequency in the 96 GHz band.

Advantageously, the modulation of the local wave is a frequency modulation, in particular a frequency modulation that varies according to a linear law. This modulation corresponds to a frequency ramp. The most common modulation using a frequency ramp is FMCW (frequency modulated continuous wave) modulation, which consists in applying a linear variation to the frequency of the emitted signal around a reference frequency. This modulation is compatible with separating modulation ramps into two sub-ramps that are locally mixed as close as possible to the radiating elements. The invention may apply to other modulations, provided that a desired composite modulation is able to be obtained by mixing two modulations with a smaller bandwidth.

Separating the modulation ramp into two sub-ramps that are locally mixed as close as possible to the antennas makes it possible to reduce the impact of inter-channel electrical length technological dispersion on wideband waveforms.

Indeed, the phase error obtained for an electrical length error ΔL between two channels carrying a signal of bandwidth $\Delta f_{ray}=(k+m)/m*\Delta f_0$ is $$Err_{\Delta fray} = \frac{\Delta L \cdot (k+m)/m * f\Delta 0}{c},$$

expressed as a wavelength fraction.

For significant routing lengths L, electrical length pairing errors ΔL that occur in the technological implementation may be significant, and thus produce significant phase errors, possibly degrading the performance of the antenna pattern that is formed.

Separating the modulation onto the frequency $f_0$ of the modulated local signal on the one hand, with a bandwidth $\Delta f_0$ (FIG. 1, unbroken bold line for one example of a path), and onto the frequency $f_{inter}$ of the intermediate frequency on the other hand, with the bandwidth $\Delta f_{inter}=k/m*\Delta f_0$ (FIG. 1, dashed bold line for one example of a path), makes it possible to distribute the pairing constraints over two separate paths of respective lengths $L_{f0}$ and $L_{inter}$, which are recombined in the mixing.

In this way, pairing differences in the technological implementation may be considered to be independent on the two paths, meaning that the difference in composite electrical length is expressed by a phase error that has the value of the weighted sum of the differences on these two paths.

As a result, $$Err_{\Delta composite} = \frac{\Delta L_{f0} \cdot \Delta f0}{c} + \frac{\Delta L_{inter} \cdot \frac{k}{m} \cdot \Delta f0}{c}$$

With $\Delta L_{f0} \leq \Delta L$ and $\Delta L_{inter} \leq \Delta L$, $Err_{\Delta composite} \leq Err_{\Delta fray}$ The error thus produced by the combination of the error on the two paths (frequency $f_0$ and intermediate frequency $f_{inter}$) is tantamount to summing two random variables, weighted by their respective supported bandwidth fraction. This sum statistically produces a reduction in the standard deviation of the composite error, in comparison with a length error supported by just one path, given that the technological implementation errors between the two paths are not perfectly correlated random variables. The statistical support of the electrical length pairing error is typically dependent on the characteristics of the manufacturing process.

Thus, separating the modulation into two separate branches makes it possible to reduce the impact of pairing errors between the various emission and reception channels, in the context of using wide modulation bands.

Applying the modulation to the local signal at the frequency $f_0$ also has an advantage in terms of spectral purity. Since the mixing operation performed by the frequency transposition components (5, 6) is not perfect, there is, at emission, leakage of the modulated local signal $S_{f0+\Delta f0}$ and of the intermediate-frequency emission signal $S_{f\_inter\_Tx+\Delta f\_inter\_Tx}$ directly to the output signal, and also production of harmonics and intermodulations of these signals via non-linearities of the mixing and amplification functions.

Figure 3A:
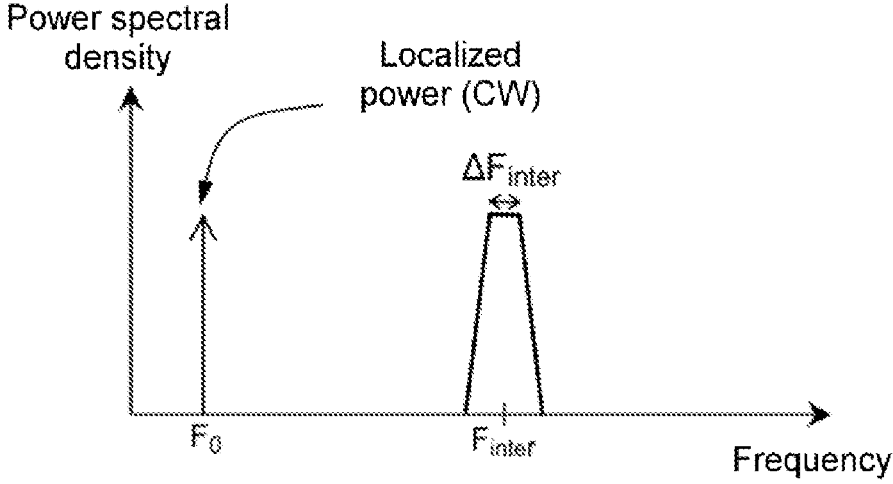
FIG. 3*a* illustrates the power spectral densities of the input signals and output signals of the frequency transposition components for a conventional architecture.
Figure 3A:
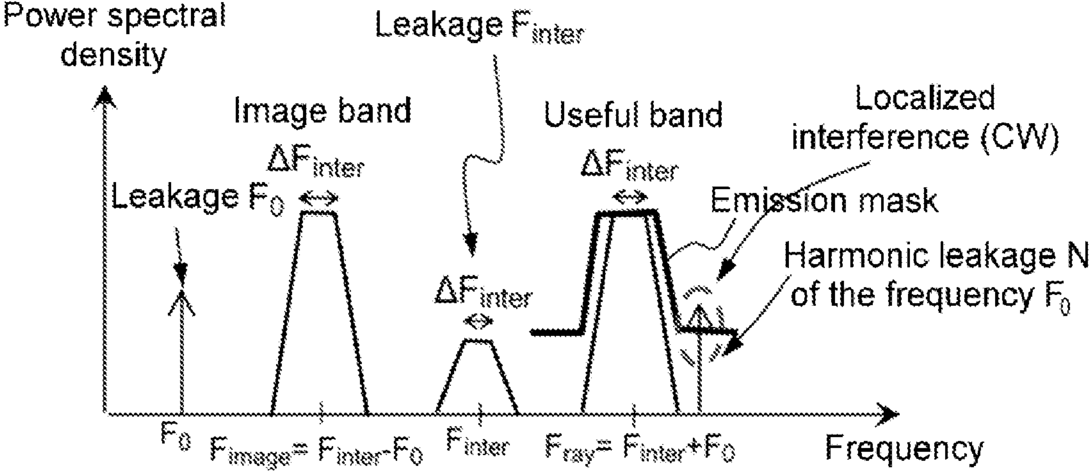
Figure 3B:
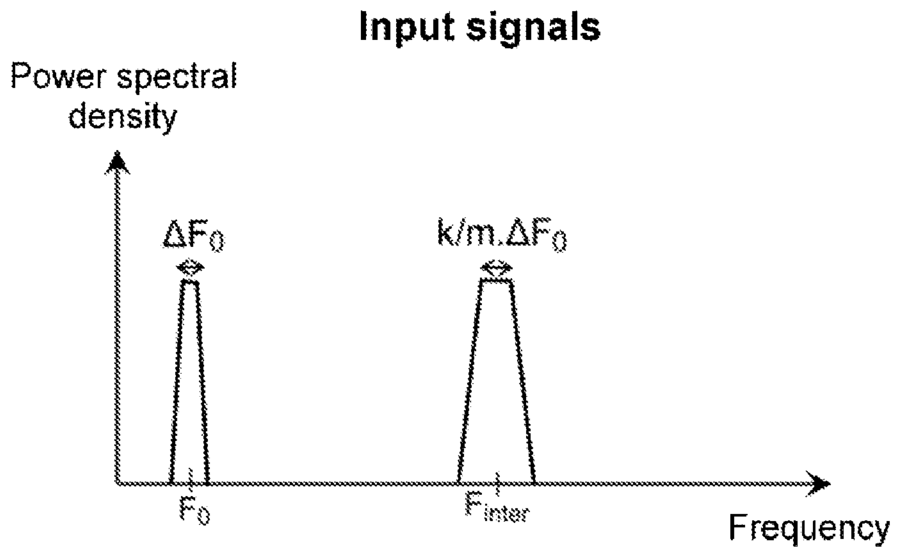
FIG. 3*b* illustrates the power spectral densities of the input signals and output signals of the frequency transposition components for an architecture according to the invention.
Figure 3B:
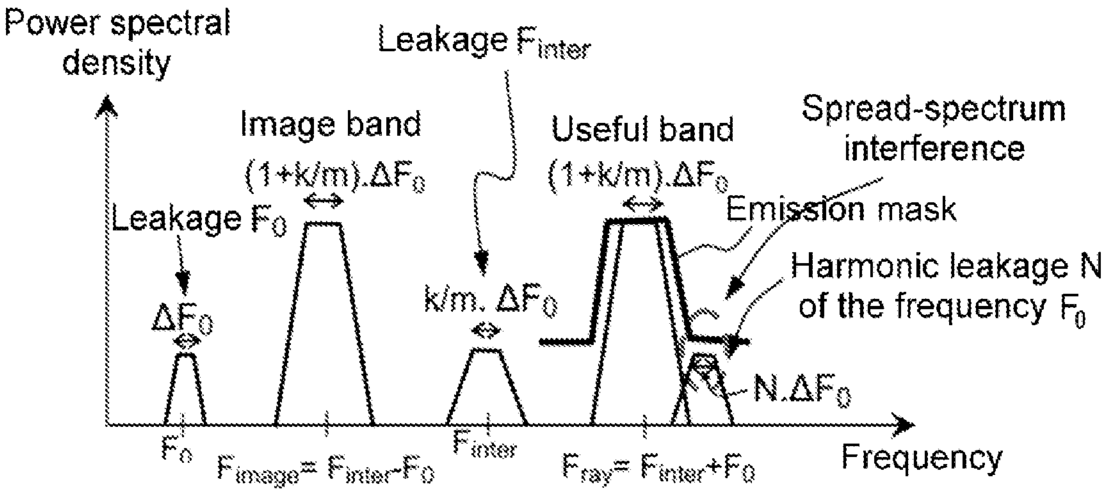

Given that the modulated local signal $S_{f0+\Delta f0}$ and the intermediate-frequency emission signal $S_{f\_inter\_Tx+\Delta f\_inter\_Tx}$ both carry a modulation (FIG. 3*b*, input signals), the signals at the output of the frequency transposition components have a spread-spectrum power spectral density over their modulation band (FIG. 3*b*, output signals: spread-spectrum interference). In the same way, parasitic harmonics and intermodulations preserve the modulation and therefore have a power spectral density that is also diluted over their modulation frequency band (for example harmonic leakage N of the frequency $f_0$).

The emitted signal thus does not have any localized parasitic lines that would require specific filtering in order to comply with emission masks, relative to the power density of the signal in the band of interest. The emission templates correspond to established power spectral density standards to be complied with.

This advantage is not present in conventional mixing architectures, which use a non-modulated local oscillator signal (FIG. 3*a*), and which thus produce one-off frequency interference, which may require specific filtering to comply with normative templates (in FIG. 3*a*, the harmonic leakage is above the emission template). With identical power, the system according to the invention makes it possible to obtain frequency spreading of the power spectral density, and therefore a lower power spectral density.

According to one advantageous embodiment, the radar imaging system comprises a plurality of integrated circuits that are synchronized with one another and accommodate the emission and reception channels. The synchronous networking of multiple integrated circuits makes it possible to increase the number of emission and reception channels, and therefore to increase the spatial resolution of the MIMO radar, and also the range budget.

The local wave is modulated by a modulator 2 located in a master integrated circuit 11, and the modulated local signal $S_{f0+\Delta f0}$ may be used as synchronization signal for other integrated circuits, called slave integrated circuits 12. Each slave integrated circuit 12 comprises its own frequency multiplier 4. Since the slave integrated circuits may indeed be spaced from one another by several tens of centimetres (distance d3 in FIG. 1), it is important for the frequency multiplication to take place as close as possible to the frequency transposition components of each integrated circuit.

The invention has been described in the context of a multiple input multiple output (MIMO) radar system. It could be expanded to any type of radar system, provided that a desired composite modulation is able to be obtained by mixing two modulations with a smaller bandwidth.

In this case, the radar system, which comprises at least one emission channel and one reception channel, comprises:

- a frequency synthesizer, configured to generate a modulated local signal ($S_{f0+\Delta f0}$), obtained by modulating a local signal having a predefined frequency ($f_0$) over a modulation bandwidth ($\Delta f_0$);
- at least one frequency multiplier, configured to supply an intermediate-frequency local signal ($S_{f\_inter+\Delta f\_inter}$) to the emission channel and to the reception channel, the intermediate-frequency local signal ($S_{f\_inter+\Delta f\_inter}$) being a fractional multiple of the modulated local signal ($S_{f0+\Delta f0}$), the multiplication being applied to the predefined frequency ($f_0$) and to the modulation band ($\Delta f_0$);
- at least one emission frequency transposition component, the emission frequency transposition component being connected between the emission channel and an emission radiating element, and configured to mix an intermediate-frequency emission signal ($S_{f\_inter\_Tx+\Delta f\_inter\_Tx}$) from the associated emission channel and the modulated local signal ($S_{f0+\Delta f0}$) so as to obtain a signal ($S_{f\_ray\_Tx+\Delta f\_ray\_Tx}$) that is transmitted to the emission radiating element;
- at least one reception frequency transposition component, the reception frequency transposition components and the emission frequency transposition component being synchronized with one another by the modulated local wave ($S_{f0+\Delta f0}$), the reception frequency transposition component being connected between the reception channel and a reception radiating element, and configured to mix a signal ($S_{f\_ray\_Tx+\Delta f\_ray\_Tx}$) received by the associated reception radiating element with the modulated local signal ($S_{f0+\Delta f0}$) so as to obtain an intermediate-frequency reception signal ($S_{f\_inter\_Rx+\Delta f\_inter\_Rx}$);
- the reception channel being configured to demodulate the intermediate-frequency reception signal ($S_{f\_inter\_Rx+\Delta f\_inter\_Rx}$) using the intermediate-frequency local signal ($S_{f\_inter+\Delta f\_inter}$).

The invention claimed is:

1. Multiple input multiple output (MIMO) radar system for imaging applications, configured to emit and receive signals respectively on a plurality of emission channels and reception channels, the radar system comprising:

a frequency synthesizer, configured to generate a modulated local signal ($S_{f0+\Delta f0}$), obtained by modulating a local signal having a predefined frequency ($f_0$) over a modulation bandwidth ($\Delta f_0$);

at least one frequency multiplier, configured to supply an intermediate-frequency local signal ($S_{f\_inter+\Delta f\_inter}$) to each emission channel and to each reception channel, the intermediate-frequency local signal ($S_{f\_inter+\Delta f\_inter}$) being a fractional multiple of the modulated local signal ($S_{f0+\Delta f0}$), the fractional multiple being greater strictly than 1 and being applied to the predefined frequency ($f_0$) and to the modulation band ($\Delta f_0$);

a plurality of emission frequency transposition components, the plurality of emission frequency transposition components being synchronized with one another by the modulated local wave ($S_{f0+\Delta f0}$), each emission frequency transposition component being connected between an emission channel and an emission radiating element, and configured to mix an intermediate-frequency emission signal ($S_{f\_inter\_Tx+\Delta f\_inter\_Tx}$) from an associated emission channel and the modulated local signal ($S_{f0+\Delta f0}$) so as to obtain a signal ($S_{f\_ray\_Tx+\Delta f\_ray\_Tx}$) that is transmitted to the emission radiating element;

a plurality of reception frequency transposition components, the plurality of reception frequency transposition components being synchronized with one another by the modulated local signal ($S_{f0+\Delta f0}$), each reception frequency transposition component being connected between a reception channel and a reception radiating element, and configured to mix a signal ($S_{f\_ray\_Rx+\Delta f\_ray\_Rx}$) received by an associated reception radiating element with the modulated local signal ($S_{f0+\Delta f0}$) so as to obtain an intermediate-frequency reception signal ($S_{f\_inter\_Rx+\Delta f\_inter\_Rx}$); and the reception channels being configured to demodulate the intermediate-frequency reception signal ($S_{f\_inter\_Rx+\Delta f\_inter\_Rx}$) using the intermediate-frequency local signal ($S_{f\_inter+\Delta f\_inter}$).

2. System according to claim 1, wherein the fractional multiple is equal to k/m where m=1, and k is between 2 and 6.

3. System according to claim 2, wherein k=4, and wherein the intermediate-frequency local signal ($S_{f\_inter+\Delta f\_inter}$) has a carrier frequency between 76 and 81 GHz.

4. System according to claim 1, wherein the modulation of the local signal is a frequency modulation.

5. System according to claim 4, wherein the frequency modulation varies according to a frequency ramp-type linear law.

6. System according to claim 1, wherein the emission frequency transposition components and the reception frequency transposition components are monolithic microwave integrated circuits (MMIC).

7. System according to claim 1, wherein the emission channels and the reception channels are distributed in at least two integrated circuits, each integrated circuit comprising its own frequency multiplier, the frequency synthesizer being located in one of the integrated circuits, called master integrated circuit, the at least one other integrated circuit being called slave integrated circuit, the master integrated circuit and the slave integrated circuit being networked such that the frequency multiplier of each slave integrated circuit receives the modulated local signal ($S_{f0+\Delta f0}$).

8. Aircraft comprising the system according to claim 1.

9. Radar processing method for imaging applications, using a radar comprising a plurality of emission channels and reception channels, the method comprising:

generating a modulated local signal ($S_{f0+\Delta f0}$), obtained by modulating a local wave having a predefined frequency ($f_0$) over a modulation bandwidth ($\Delta f_0$);

supplying an intermediate-frequency local signal ($S_{f\_inter+\Delta f\_inter}$) to each emission channel and to each reception channel, the intermediate-frequency local signal ($S_{f\_inter+\Delta f\_inter}$) being a fractional multiple of the modulated local signal ($S_{f0+\Delta f0}$), the fractional multiple being greater strictly than 1 and being applied to the predefined frequency ($f_0$) and to the modulation band ($\Delta f_0$);

synchronizing a plurality of emission frequency transposition components with one another, the plurality of emission frequency transposition components being synchronized with one another by the modulated local signal ($S_{f0+\Delta f0}$), each emission frequency transposition component being connected between an emission channel and an emission radiating element, and mixing an intermediate-frequency emission signal ($S_{f\_inter\_Tx+\Delta f\_inter\_Tx}$) from an associated emission channel and the modulated local signal ($S_{f0+\Delta f0}$) so as to obtain a signal ($S_{f\_ray\_Tx+\Delta f\_ray\_Tx}$) that is transmitted to the emission radiating element;

synchronizing a plurality of reception frequency transposition components with one another, the plurality of reception frequency transposition components being synchronized with one another by the modulated local signal ($S_{f0+\Delta f0}$), each reception frequency transposition component being connected between a reception channel and a reception radiating element, and mixing a signal ($S_{f\_ray\_Rx+\Delta f\_ray\_Rx}$) received by an associated reception radiating element with the modulated local signal ($S_{f0+\Delta f0}$) so as to obtain an intermediate-frequency reception signal ($S_{f\_inter\_Rx+\Delta f\_inter\_Rx}$); and demodulating the intermediate-frequency reception signal ($S_{f\_inter\_Rx+\Delta f\_inter\_Rx}$) using the intermediate-frequency local signal ($S_{f\_inter+\Delta f\_inter}$).

* * * * *